US005989768A

United States Patent [19]
Little

[11] Patent Number: 5,989,768
[45] Date of Patent: *Nov. 23, 1999

[54] CHARGE-MODIFIED METAL OXIDES WITH CYCLIC SILAZANE AND ELECTROSTATOGRAPHIC SYSTEMS INCORPORATING SAME

[75] Inventor: Charles B. Little, Champaign, Ill.

[73] Assignee: Cabot Corporation, Boston, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/812,788

[22] Filed: Mar. 6, 1997

[51] Int. Cl.⁶ ............................................. G03G 9/097
[52] U.S. Cl. .................................... 430/110; 430/120
[58] Field of Search ............................ 430/110, 106, 430/120

[56] References Cited

U.S. PATENT DOCUMENTS

| | | | |
|---|---|---|---|
| 3,146,250 | 8/1964 | Speier | 260/448.2 |
| 3,652,214 | 3/1972 | Aboutboul et al. | 23/182 |
| 3,838,094 | 9/1974 | Sporck | 260/37 |
| 4,618,556 | 10/1986 | Takenouchi | 430/110 |
| 4,640,882 | 2/1987 | Mitsuhashi et al. | 430/110 |
| 4,652,509 | 3/1987 | Shirose et al. | 430/110 |
| 4,680,245 | 7/1987 | Suematsu et al. | 430/110 |
| 4,868,084 | 9/1989 | Uchide et al. | 430/110 |
| 4,902,570 | 2/1990 | Heinemann et al. | 428/405 |
| 4,906,548 | 3/1990 | Uchide et al. | 430/126 |
| 4,933,413 | 6/1990 | Varaprath | 528/26 |
| 5,024,915 | 6/1991 | Sato et al. | 430/110 |
| 5,101,056 | 3/1992 | Kampling et al. | 556/419 |
| 5,110,967 | 5/1992 | King et al. | 556/407 |
| 5,166,029 | 11/1992 | Bayley et al. | 430/110 |
| 5,239,099 | 8/1993 | King et al. | 556/407 |
| 5,256,487 | 10/1993 | Myers | 428/447 |
| 5,270,027 | 12/1993 | Balducci et al. | 423/338 |
| 5,270,770 | 12/1993 | Kukimoto et al. | 355/274 |
| 5,275,900 | 1/1994 | Ong et al. | 430/106 |
| 5,281,736 | 1/1994 | Tachikawa | 556/407 |
| 5,281,737 | 1/1994 | Tachikawa | 556/407 |
| 5,346,793 | 9/1994 | Bertrand et al. | 430/110 |
| 5,354,880 | 10/1994 | Pepe et al. | 556/407 |
| 5,372,905 | 12/1994 | Deusser et al. | 430/110 |
| 5,376,172 | 12/1994 | Tripp et al. | 106/490 |
| 5,384,194 | 1/1995 | Deusser et al. | 428/405 |
| 5,391,452 | 2/1995 | Sacripante et al. | 430/106.6 |
| 5,397,667 | 3/1995 | Law et al. | 430/106 |
| 5,405,889 | 4/1995 | Hatanaka et al. | 523/210 |
| 5,415,936 | 5/1995 | Deusser et al. | 428/405 |
| 5,419,928 | 5/1995 | Deusser et al. | 427/384 |
| 5,429,873 | 7/1995 | Deusser et al. | 428/405 |
| 5,446,180 | 8/1995 | Tachikawa | 556/408 |
| 5,451,481 | 9/1995 | Law et al. | 430/110 |
| 5,455,137 | 10/1995 | Diaz et al. | 430/110 |
| 5,464,722 | 11/1995 | Tomiyama et al. | 430/137 |
| 5,480,755 | 1/1996 | Uchiyama et al. | 430/106.6 |
| 5,482,806 | 1/1996 | Suzuki et al. | 430/106.6 |
| 5,486,420 | 1/1996 | Nishihara et al. | 428/405 |
| 5,489,497 | 2/1996 | Young et al. | 430/106.6 |
| 5,501,933 | 3/1996 | Deusser et al. | 430/110 |
| 5,508,360 | 4/1996 | Cifuentes et al. | 525/477 |
| 5,510,221 | 4/1996 | Matalevich et al. | 430/106.6 |
| 5,532,097 | 7/1996 | Tavernier et al. | 430/110 |
| 5,532,098 | 7/1996 | Ong | 430/110 |
| 5,534,981 | 7/1996 | Ohno et al. | 355/245 |

FOREIGN PATENT DOCUMENTS

| | | | |
|---|---|---|---|
| 0 438 245 | 7/1991 | European Pat. Off. | G03G 9/097 |
| 0578185 | 12/1994 | European Pat. Off. | C07F 7/10 |
| 0578186 | 12/1994 | European Pat. Off. | C07F 7/10 |
| 0661290 | 5/1995 | European Pat. Off. | C07F 7/18 |
| 0 713 153 | 5/1996 | European Pat. Off. | G03G 9/097 |
| 4234846 | 4/1994 | Germany | C08G 77/388 |
| 61-036338 | 2/1986 | Japan . | |
| 5-019526 | 1/1993 | Japan . | |
| 2296915 | 7/1996 | United Kingdom | C09C 3/12 |
| WO 94/14820 | 7/1994 | WIPO | C07F 7/10 |

OTHER PUBLICATIONS

Japanese Patent Abstract. vol. No. 293 (P–1550), dated Jun. 4, 1993 relating to JP 05 019526 A (Shin Etsu), Jan. 29, 1993.

Derwent Abstract No. AN 86–090833 relating to JP 61 036 338 A (Mitsubishi) Feb. 21, 1986.

Degussa Corporation, Product Information entitled, "Experimental Product: Aerosil®R504," Revision No. 2, dated Apr., 1996.

Wacker–Chemie GmbH, Product Information entitled, "Wacker HDK® The Fumed Silica," dated Dec., 1994.

Cabot Corporation, Technical Data Sheet entitled, "CAB–O––SIL® TS–530 Treated Fumed Silica," dated Nov., 1991.

Wacker–Chemie GmbH, Preliminary Data Sheet, entitled, "Wacker HDK H 3050 EP VP for Positive Chargeable Toners," undated.

A. Weingartner et al., Organosilicon Chem., entitled, "Synthesis and Thermolysis Reactions of Si–functionalized 2–Silaazetidines," pp. 115–117 (1994).

Tsu–Tzu Tsai et al., The Journal of Organic Chemistry, entitled, "Synthesis of 1,1–Diethoxy–2–(trimethylsily1)–1–sila–2–azacyclopentane," vol. 34, No. 11, Nov., 1969.

U. Klingebiel et al. entitled, "Formation of 1–Aza–8–sila–bicyclo[4,2,0] octane under Cleavage of a C–H Bond", vol. 31b, p. 1545, dated 1976.

Antoine Baceiredo et al., Nouveau Journal de Chimie, entitled, "The Curtius Rearrangement in the Silicon Series: Synthetic Mechanisms and Applications," vol. 7, No. 11, pp. 645–651, dated Apr. 11, 1983.

(List continued on next page.)

*Primary Examiner*—John Goodrow

[57] ABSTRACT

The present invention relates to a charge-modified metal oxide and to toner and developer compositions incorporating same. The charge-modified metal oxide includes a metal oxide having a cyclic silazane treated therewith and optionally a second treating agent for imparting hydrophobicity. The charge-modified metal oxide have been found to provide effective free-flow attributes to the toner or developer composition and may further influence the charging characteristics of same.

25 Claims, 5 Drawing Sheets

OTHER PUBLICATIONS

A.G. Brook et al., Organometallics, entitled, "Silaaziridines from the Reaction of Isonitriles with Stable Silenes," vol. 7, No. 10, pp. 2245–2247, dated 1988.

A.G. Brook et al., Organometallics, entitled, "1–Sila–3–azacyclobutanes: The Insertion of Isocyanides into Silaaziridines," vol. 8, No. 3, pp. 850–852, dated 1989.

Juliusz G. Radziszewski et al., Journal of American Chemistry Society, entitled, "Twisted Si=N Bonds: Matrix Isolation of Bridgehead Silanimines," vol. 115, No. 18, pp. 8401–8508, dated 1993.

A.G. Brook et al., Organometallics, entitiled, "Ring Insertion Reactions of Silaaziridines with Aldehydes and Isocyanates," vol. 12, No. 2, pp. 529–534, dated 1993.

Kohei Tamao et al., Journal of American Chemistry Society, entitled, "X–Ray Structural Analysis and Thermal Decomposition of 1–Aza–2–silacyclobutanes: A New Route to Silanimine Species," vol. 114, No. 1, pp. 218–221, dated 1992.

M.G. Voronkov et al., Journal of Organometallic Chemistry, entitled, "A Novel Synthetic Route to 1–aza–2–silacyclopentane Derivatives," vol. 406, pp. 87–89, dated 1991.

Speier et al., Journal of Organometallic Chemistry, entitled, "Syntheses of (3–Aminoalkyl)silicon Compounds," vol. 36, No. 21, pp. 3120–3126, dated 1971.

Kohei Tamao et al., Organmetallics, entitled, "Deuterium––Labeling Studies on the Regio– and Stereoselective Intramolecular Hydrosilation of Allyl Alcohols and Allylamines Catalyzed by Platinum and Rhodium Complexes," vol. 12, No. 6, pp. 2297–2308, dated 1993.

J.R. Heley, Journal of Non–Crystalline Solids, entitled, "Fine Low Density Silica Powders Prepared by Supercritical Drying of Gels Derived from Silicon Tetrachloride," vol. 186, pp. 30–36, dated 1995.

Kohei Tamao et al., Journal of Organ. Chem., entitled, "Platinum–Catalyzed Intramolecular Hydrosilation of Allylmines: Formation of 1–Aza–2–Silacyclobutanes and Application to Stereoselective Synthesis of 2–Amino Alcohols," vol. 55, No. 11, pp. 3438–3439, dated 1990.

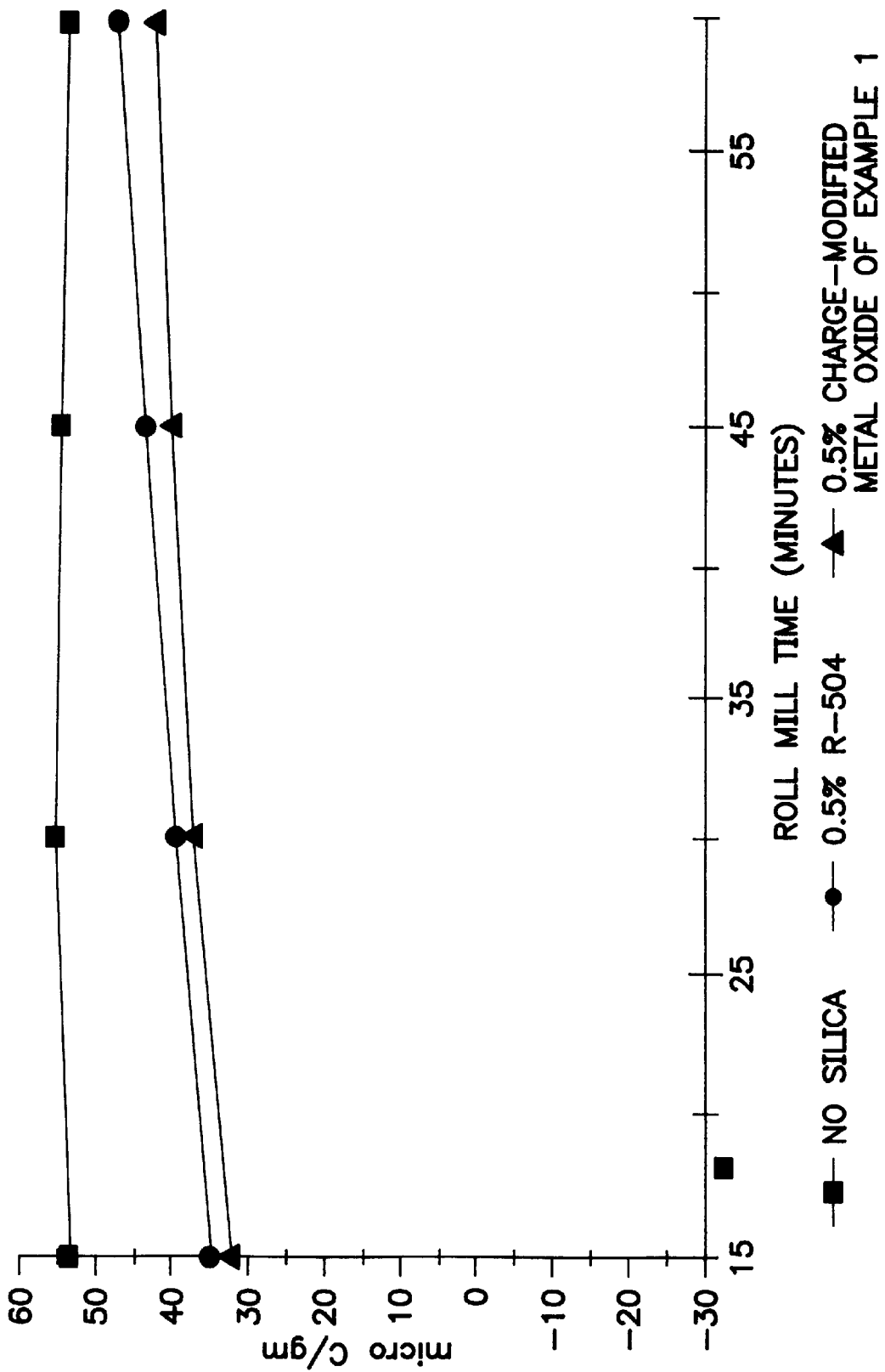

5,989,768

CHARGE-MODIFIED METAL OXIDES WITH CYCLIC SILAZANE AND ELECTROSTATOGRAPHIC SYSTEMS INCORPORATING SAME

BACKGROUND OF THE INVENTION

1. Field of the Invention

The present invention relates to a modified metal oxide and, more particularly, to a charge-modified metal oxide and toner and developer compositions incorporating same.

2. Background of Related Art

In electrophotography, an image comprising an electrostatic field pattern (also referred to as an electrostatic latent image), usually of nonuniform strength, is formed on an insulative surface of an electrophotographic element. The insulative surface comprises a photoconductive layer and an electrically conductive substrate. The electrostatic latent image may be formed by imagewise photo-induced dissipation of the strength of portions of an electrostatic field of uniform strength previously formed on the insulative surface. Typically, the electrostatic latent image is then developed into a toner image by contacting the latent image with a toner composition generally containing a colorant. The toner image is then transferred onto a transfer medium such as paper and fixed thereon by heating and/or pressure. The last step involves cleaning residual toner from the electrophotographic element.

Dry toner compositions used in electrophotography are divided into one-component systems composed of a toner, generally including a binder resin having a colorant dispersed therein, and two-component compositions including a toner and a carrier. Charge control agents are often melt mixed with the toner resin to control the chargeability of the toner during use. In order that toner compositions have process suitability in copying, they are required to be excellent in fluidity, anti-caking properties, fixability, chargeability, cleaning properties, and the like. To improve these properties, particularly fluidity, anti-caking properties, and chargeability, extraparticulate inorganic fine particles are frequently added to toner compositions.

Dispersibility of the inorganic fine particles has a great influence on toner composition characteristics. Particles of poor dispersibility tend to fail to obtain desired effects of improving fluidity, chargeability and anti-caking properties or tend to cause adhesion of toner particles to a photoreceptor due to insufficient cleaning, resulting in image defects.

Inorganic fine particles, such as fumed silicas, may be used to provide good dispersibility, fluidity, and anti-caking properties in toner compositions. Unfortunately, untreated fumed silica normally tribocharges negatively which tends to seriously reduce the chargeability of positively chargeable toner compositions. Because the silica also effects the charge of negatively chargeable toners, it complicates the design and use of negatively chargeable toner compositions. The strong negative charge of fumed silica adversely effects the reproducibility of both positively and negatively chargeable toner compositions by exhibiting great variations of chargeability with environmental changes, resulting in image quality variations.

In an effort to overcome these problems, silica particles have been surface treated with various compounds such as aminosilanes, amino-functional silicone fluids, polyacrylates, quaternary ammonium salts and the like to form positively chargeable silica particles. See, for example, U.S. Pat. No. 4,680,245 to Suematsu et al., U.S. Pat. No. 4,902,570 to Heinemann et al., U.S. Pat. No. 5,376,172 to Tripp et al., and U.S. Pat. No. 5,486,420 to Nishihara et al., for varying surface treating agents for use with colloidal silicas in toner formulations.

Although many charge influencing or controlling additives are known, there remains a need for alternative additives which impart or assist in imparting a positive charge to the toner particles in toner and developer compositions. In addition, there continues to be a need for charge influencing or controlling additives which have improved batch to batch reproducibility and no by-products, thereby reducing variability and manufacturing costs. Furthermore, a need remains for improved additives which provide good dispersibility, fluidity, chargeability and anti-caking properties in toner and developer compositions.

SUMMARY OF THE INVENTION

The present invention is directed to a charge-modified metal oxide which includes a metal oxide having a cyclic silazane treated therewith. The metal oxide may be a silica, an alumina, a ceria, a germania, a titania, a zirconia, and mixtures thereof.

The charge-modified metal oxide has been found to have improved batch to batch reproducibility and no by-products, thereby reducing variability and manufacturing costs.

The present invention is also directed to a positively charged toner composition which includes resin particles, at least one colorant, a charge-modified metal oxide which includes a metal oxide having a cyclic silazane treated therewith and is produced by combining these products utilizing conventional mixing techniques. Also disclosed is a developer composition which includes carrier particles and the toner described above.

Furthermore, a need remains for improved additives which provide good dispersibility, fluidity, chargeability and anti-caking properties in toner and developer compositions.

The present invention is further directed to a method of imaging which includes the steps of formulating an electrostatic latent image on a negatively charged photoconductive imaging member, affecting the development thereof with a toner composition including resin particles, at least one colorant, and a charge-modified metal oxide having a cyclic silazane treated therewith, and thereafter transferring the developed image onto a suitable substrate.

BRIEF DESCRIPTION OF THE DRAWINGS

FIG. 5 is an illustration of tribocharging behavior of a developer in accordance with the present invention containing 0.5% of a free-flow additive, as represented by the charge to mass ratio ($\mu$C/gm) on the y-axis and roll mill time on the x-axis.

DETAILED DESCRIPTION OF THE INVENTION

Figure 1:
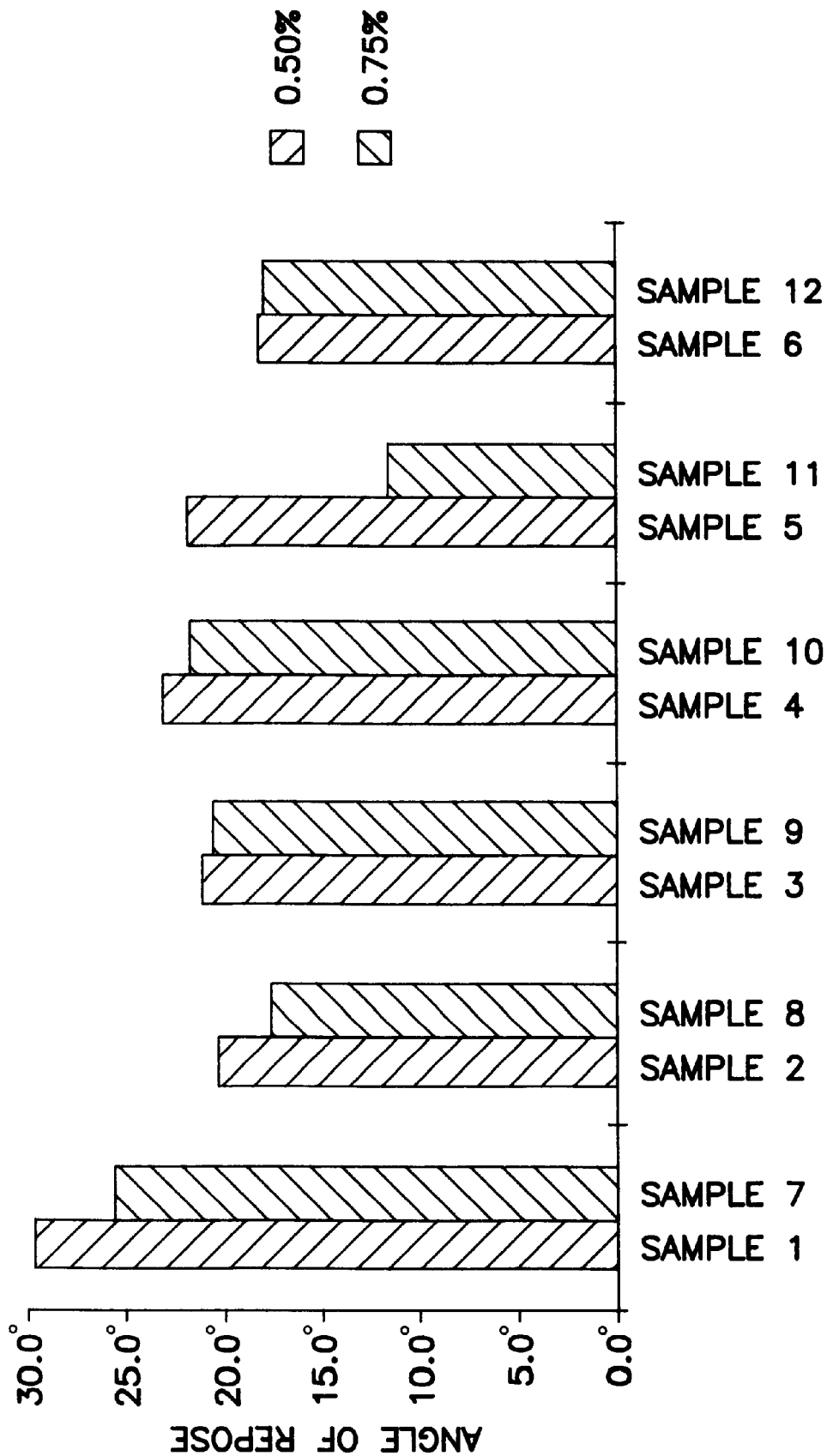
FIG. 1 is an illustration of flowability of a toner, as determined by the angle of repose.

The present invention is directed to a charge-modified metal oxide which includes a metal oxide having a cyclic silazane treated therewith.

The metal oxides of the present invention are selected from the group of silica, alumina, ceria, germania, titania, zirconia and mixtures thereof. In addition, the metal oxides may be a mixed or cofumed product. Preferably, the metal oxide is a fumed, cofumed or precipitated material or is a gel processed material including for example, aerogels, silica-gels, xerogels, hydrogels and the like. The metal oxide may be produced utilizing techniques known to those skilled in the art. For example, the production of a fumed metal oxide is a well-documented process which involves the hydrolysis of suitable feed stock vapor (such as aluminum chloride for a fumed alumina, and silicon tetrachloride for fumed silica) in a flame of hydrogen and oxygen. Molten particles of roughly spherical shape are formed in the combustion process, the diameters of which are varied through process parameters. These molten spheres, typically referred to as primary particles, fuse with one another by undergoing collisions at their contact points to form branched, three dimensional chain-like aggregates. The formation of the aggregates is considered to be irreversible as a result of the fusion between the primary particles. During cooling and collecting, the aggregates undergo further collisions that may result in some mechanical entanglements to form agglomerates. These agglomerates are thought to be loosely held together by van der Waals forces and can be reversed, i.e. de-agglomerated, by proper dispersion in a suitable media.

Mixed or cofumed may also be produced utilizing conventional techniques known to those skilled in the art including, for example, GB 2296915A to Ettlinger et al., the specification of which is incorporated herein in its entirety by reference.

Precipitated metal oxides may be manufactured utilizing conventional techniques and are typically formed by the coagulation of the desired particles from an aqueous medium under the influence of high salt concentrations, acids or other coagulants. The particles are filtered, washed, dried and separated from residues of other reaction products by conventional techniques known to those skilled in the art.

The manufacture of gel based materials, e.g. aerogels, xerogels, hydrogels and other gels, is well known to those skilled in the art and may be accomplished utilizing conventional techniques, for example, U.S. Pat. No. 3,652,214 to Aboutboul, et al., U.S. Pat. No. 5,270,027 to Balducci, et al., U.S. Pat. No. 2,188,007 to Kistler, and as disclosed in the article by Heley, et al., entitled *"Fine Low Density Silica Powders Prepared by Supercritical Drying of Gels Derived From Silicon Tetrachloride,"* Journal of Non-Crystalline Solids, 186, 30–36 (1995), the disclosures of which are incorporated herein in their entirety by reference.

The size of the primary spherical particles that comprise the metal oxide aggregates determine the surface area. The surface area of the metal oxides may be measured by the nitrogen adsorption method of S. Brunauer, P. H. Emmet, and I. Teller, J. Am. Chemical Society, Volume 60, Page 309 (1938) and is commonly referred to as BET. Typical BET values for metal oxides range from 40 m$^2$/g to about 1000 m$^2$/g, preferably between 50 m$^2$/g to about 400 m$^2$/g. Although many commercially available metal oxides are suitable, CAB-O-SIL® fumed silica having a surface area between 100 m$^2$/g to about 350 m$^2$/g, available from the Cab-O-Sil Division of Cabot Corporation, Tuscola, Ill., is preferred.

The preparation of cyclic silazanes are well known to those skilled in the art and may be accomplished utilizing a number of conventional techniques. Representative examples of the cyclic silazanes useful in the present invention include those prepared by the cyclization reaction of an amine (e.g. methylamine) with a linear difunctional silane, the product and processes of which are described in further detail in U.S. Pat. No. 3,146,250 to Speier, U.S. Pat. Nos. 5,110,967 and 5,239,099, both to King et al., and as disclosed in the article by Speier et al., entitled *"Syntheses of (3-Aminoalkyl)silicon Compounds,"* Journal of Organic Chemistry, Volume 36, No. 21. pp 3120–3126 (1971), and M. G. Voronkov et al., entitled, *"A novel synthetic route to 1-aza-2-silacyclopentane,"* Journal of Organometallic Chemistry, Volume 406, pp 87–89 (1991), the disclosures of which are incorporated herein in their entirety by reference. Alternatively, the cyclic silazane may be prepared using a base-catalyzed cyclization reaction of an aminoalkylalkoxysilane, as described in U.S. Pat. No. 5,354,880 to Pepe et al., the disclosure of which is incorporated herein in its entirety by reference. The cyclic silazane may further be prepared by intramolecular hydrosilation, as illustrated and described in U.S. Pat. Nos. 5,281,736 and 5,281,737, both to Tachikawa and the articles by Tamao et al. entitled, *"Platinum-Catalyzed Intramolecular Hydrosilation of Allyamines: Formation of 1-Aza-2-silacyclobutanes and Application to Stereoselective Synthesis of 2-Amino Alcohols,"* Journal of Organic Chemistry, Volume 55, pp 3438–3439 and *"Deuterium-Labeling Studies on the Regio- and Stereoselective Intramolecular Hydrosilation of Allyl Alcohols and Allylamines Catalyzed by Platinum and Rhodium Complexes,"* Journal of Organometallics, Volume 12, pp 2297–2308 (1993), the disclosures of which are incorporated herein in their entirety by reference.

In a preferred embodiment, the cyclic silazanes used in the present invention are represented by the following formula:

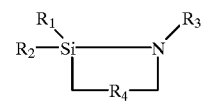

wherein $R_1$ and $R_2$ are independently selected from the group consisting of: hydrogen, halogen, alkyl, alkoxy, aryl, and aryloxy; $R_3$ is selected from the group consisting of: hydrogen, (CH$_2$)$_n$CH$_3$, wherein n is an integer between 0 and 3, C(O)(CH$_2$)$_n$CH$_3$, wherein n is an integer between 0 and 3, C(O)NH$_2$; C(O)NH(CH$_2$)$_n$CH$_3$, wherein n is an integer between 0 and 3, and C(O)N[(CH$_2$)$_n$CH$_3$](CH$_2$)$_m$CH$_3$, wherein n and m are integers between 0 and 3; and $R_4$ is represented by the formula [(CH$_2$)$_a$(CHX)$_b$(CYZ)$_c$], wherein X, Y and Z are independently selected from the group consisting of: hydrogen, halogen, alkyl, alkoxy, aryl, and aryloxy, and a, b, and c are integers between 0 and 6 satisfying the condition that (a+b+c) equals an integer between 2 and 6.

More preferably, the cyclic silazane is a five or six member ring having the formula

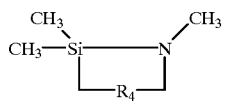

wherein $R_4$ is represented by the formula $[(CH_2)_a(CHX)_b, (CYZ)_c]$, wherein X, Y and Z are independently selected from the group consisting of: hydrogen, halogen, alkyl, alkoxy, aryl, and aryloxy, and a, b, and c are integers between 0 and 6 satisfying the condition that (a+b+c) equals an integer between 3 and 4.

The charge-modified metal oxide may be prepared utilizing dry or wet techniques known to those skilled in the art which will provide uniform distribution of the cyclic silazane on the metal oxide surface. For example, a dry treatment method may include stirring or mixing the metal oxide and the cyclic silazane in a fluidized bed reactor. Alternatively, a wet treatment method may include dispersing the metal oxide into a solvent to form a metal oxide slurry, and adding the cyclic silazane to the slurry to thereby modify the metal oxide surface with the cyclic silazane. In addition, the charge-modified metal oxide may be prepared utilizing a batch or continuous process wherein the dry metal oxide is contacted with a liquid or vapor cyclic silazane with sufficient mixing. In a preferred embodiment, the mixture is then held for a period of time at a temperature sufficient to modify the surface of the properties of the metal oxide. Typically, a temperature range from about 25° C. to 200° C. for a time period between about 30 minutes and about 16 hours has been found suitable. In a preferred embodiment, a temperature range from about 80° C. to 100° C. for a time period between about 30 minutes and about 2 hours has been found to effectively modify the properties of the metal oxide.

The metal oxide of the present invention is treated with a sufficient level of the cyclic silazane in order to achieve the desired free-flow attributes and charge influence in the particular toner or developer composition. In general, treatment of the metal oxide with an amount of the cyclic silazane sufficient to achieve between 0.01% and 2.75% by weight of elemental nitrogen, as measured by the Kjeldahl method, has been found to impart the desired free-flow attributes and charging influence. In a preferred embodiment, the metal oxide is treated with an amount of the cyclic silazane sufficient to produce an elemental nitrogen content between about 0.08% and about 1.75% by weight and, more preferably, between 0.2% and about 1.1% by weight.

In addition, the metal oxide may be subjected to additional surface treatment in order to render the surface of the metal oxide hydrophobic. The type of treating agent and level of treatment will vary depending upon the desired degree of hydrophobicity and other characteristics. Suitable treating agents include, for example, organopolysiloxanes, organosiloxanes, organosilazanes, organosilanes, halogenorganopolysiloxanes, halogenorganosiloxanes, halogenorganosilazanes, or halogenorganosilanes, including those set forth and described in GB 2296915A, the specification of which is incorporated herein in its entirety by reference. Preferred treating agents include dimethyldichlorosilane, trimethoxyoctylsilane, hexamethyldisilazane and polydimethylsiloxane. Such additional treatment may similarly use the dry or wet techniques set forth above to further subject the charge-modified metal oxide to additional hydrophobic treatment with a desired treating agent. Alternatively, it is contemplated that the metal oxide surface may first be subjected to a hydrophobic treatment prior to the treatment with the cyclic silazane.

In a preferred embodiment, the charge-modified metal oxide is subjected to comminution utilizing conventional size reduction techniques to reduce and narrow the mean agglomerate size of the metal oxide. Suitable equipment includes, for example, ball mills, grinders, jet mills, pin mills, and the like. Typically, a charge-modified metal oxide having a mean agglomerate size between about 0.05 μm to about 200 μm has been found suitable for use in the present invention. In a preferred embodiment, the charge-modified metal oxide has a mean agglomerate size between about 1 μm to about 30 μm such range having been found to improve the dispersibility of the dry, charge-modified metal oxide in the toner composition, thereby effectively providing a more uniform distribution and coating of the metal oxide onto the toner resin particles. Alternatively, it is within the scope of the present invention that the charge-modified metal oxide may be simultaneously treated with the cyclic silazane while being subjected to size reduction techniques.

The present invention is further directed to positively charged toner and developer compositions which include the charge-modified metal oxide described above.

Illustrative examples of suitable toner resins selected for the toner and developer compositions of the present invention include, polyamides, polyolefins, styrene acrylates, styrene methacrylates, styrene butadienes, crosslinked styrene polymers, epoxies, polyurethanes, vinyl resins, including homopolymers or copolymers of two or more vinyl monomers, polyesters and mixtures thereof. In particular, the resin particles may include homopolymers of styrene and its derivatives and copolymers thereof such as polystyrene, poly-p-chlorostyrene, polyvinyltoluene, styrene-p-chlorostyrene copolymer, styrene-vinyltoluene copolymer, copolymers of styrene and acrylic acid ester such as styrenemethyl acrylate copolymer, styrene-ethyl acrylate copolymer, styrene-n-butyl acrylate copolymer, styrene-2-ethylhexyl acrylate copolymer; copolymers of styrene and methacrylic acid ester such as styrene-methyl methacrylate, styrene-ethyl methacrylate, styrene-n-butyl methacrylate, styrene-2-ethylhexyl methacrylate; multi-component copolymers of styrene, acrylic acid ester and methacrylic acid ester; styrene copolymers of styrene with other vinyl monomers such as styrene-acrylonitrile copolymer, styrenevinyl methyl ether copolymer, styrene-butadiene copolymer, styrene-vinyl methyl ketone. copolymer, styreneacrylonitrile-indene copolymer, styrene-maleic acid ester copolymer, polymethyl methacrylate, polybutyl methacrylate, polyvinyl acetate, polyvinyl butyral, polyacrylic acid resin, phenolic resin, aliphatic or alicyclic hydrocarbon resin, petroleum resin, chlorin paraffin, either individually or as a mixtures. Other types of suitable resins for toner compositions of the present invention will be known to those skilled in the art. The resin particles are generally present in an effective amount, typically between 60 to about 95 weight percent.

A wide range of conventional colored pigments, dyes, or combinations of pigments and dyes may be used in the present invention. The colorant can be blue, brown, black such as carbon black, cyan, green, violet, magenta, red, yellow, as well as mixtures thereof. Suitable classes of colored pigments and dyes include, for example, anthraquinones, phthalocyanine blues, phthalocyanine greens, diazos, monoazos, pyranthrones, perylenes, heterocyclic yellows, quinacridones, and (thio)indigoids. The colorant is generally present in a amount sufficient to provide the desired color to the toner composition. Generally, the colorant is present in amounts of from about 1% by weight to about 30% by weight, however, lesser or greater amounts of the colorant may be selected.

Optional external additives may also be mixed or blended with the toner compositions of the present invention including carrier additives; additional positive or negative charge controlling agents such as quaternary ammonium salts, pyridinum salts, sulfates, phosphates, and carboxylates; flow aid additives; silicone oils; waxes such as commercially available polypropylenes and polyethylenes; and other known additives. Generally, these additives are present in amounts of from about 0.05% by weight to about 30% by weight, however, lesser or greater amounts of the additives may be selected depending on the particular system and desired properties.

Conventional equipment for dry blending of powders may be used for mixing or blending the charge-modified metal oxide of the present invention with the toner resin particles. Generally, the charge-modified metal oxide is present in amounts ranging from about 0.01% by weight to about 10% by weight, however, lesser or greater amounts of the colorant may be selected depending on the particular system and desired properties. In a preferred embodiment, the charge-modified metal oxide is present in an amount ranging from about 0.05% by weight to about 5% by weight, more preferably, from about 0.25% by weight to about 1.0% by weight. Such amounts have been found to provide effective free-flow attributes to the toner composition while maintaining or positively influencing the charging behavior of the composition.

The toner compositions can be prepared by a number of known methods, such as admixing and heating the resin particles, the charge-modified metal oxide, the colorants, optional charge enhancing additives and other additives in conventional toner extrusion devices and related equipment Other methods include spray drying, melt dispersion, extrusion processing, dispersion polymerization, suspension polymerization, optionally followed by mechanical attrition and classification to provide toner particles having a desired size and particle distribution.

The toner composition of the present invention may be used alone in monocomponent developers or may be mixed with suitable dual component developers. The carrier vehicles which can be used to form developer compositions can be selected from various materials. Such materials typically include carrier core particles and core particles overcoated with a thin layer of film-forming resin to help establish the correct triboelectric relationship and charge level with the toner employed. Suitable carriers for two component toner compositions include iron powder, glass beads, crystals of inorganic salts, ferrite powder, nickel powder, all of which are typically coated with resin coating such as an epoxy or fluorocarbon resin.

The present invention is further directed to a method of imaging which includes formulating an electrostatic latent image on a negatively charged photoconductive imaging member, affecting the development thereof with toner composition comprising resin particles, at least one colorant, and a charge-modified metal oxide having a cyclic silazane treated therewith, and thereafter transferring the developed image onto a suitable substrate.

In summary, the present invention is directed to a charge-modified metal oxide which includes a metal oxide having a cyclic silazane treated therewith and to toner and developer compositions incorporating same. The charged-modified metal oxide has been found to have numerous advantages over conventional oxides treated with silane-coupling agents including good batch to batch reproducibility, consistency and minimal or no by-products. The cyclic silazane is uniformly coated or attached to the metal oxide surface and may be partially or fully treated, as desired. As a result, variability and manufacturing costs is substantially reduced. In addition, due to the reactive nature of the cyclic structure, the manufacturing process allows the surface treatment or modification of the metal oxide to be performed under mild processing conditions. The charge-modified metal oxide has also been found to provide good dispersibility, fluidity, chargeability and anti-caking properties in toner and developer compositions.

The present invention will be further illustrated by the following examples, which are intended to be illustrative in nature and are not to be considered as limiting the scope of the invention.

EXAMPLE 1

Preparation of a Charge-Modified Metal Oxide

A charge-modified metal oxide of the present invention was prepared by charging a cylindrical metal pressure vessel at room temperature with 160 grams of CAB-O-SIL® HS-5 fumed silica having a BET surface area of about 325 m$^2$/g (available from Cabot Corporation, Tuscola, Ill.). The fumed silica was dried in the unsealed vessel in air at 200° C. for approximately 16 hours. The vessel was then sealed and cooled to room temperature under a slow purge of dry nitrogen. When the vessel and its contents reached room temperature, the nitrogen purge was stopped and the vessel was left under a slight positive pressure of dry nitrogen. Using a syringe pump and a 50 milliliter gas tight syringe fitted with a Teflon® resin needle, approximately 19 grams of a cyclic silazane having the following structure:

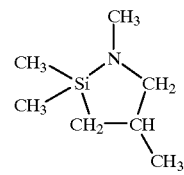

were then added continuously to the vigorously agitated, sealed vessel under a dry nitrogen atmosphere over a 10 minute time period. The cyclic silazane can be made in accordance with U.S. Pat. No. 3,146,250 to Speier. Agitation was continued for another 20 minutes after the addition of the cyclic silazane was complete. The vessel was sealed under nitrogen and left at room temperature for approximately 16 hours and then heated at 90° C. for approximately 16 hours. The resulting product was a charge-modified fumed silica.

EXAMPLE 2

Preparation of a Charge-Modified Metal Oxide

A charge-modified metal oxide of the present invention was prepared utilizing the procedure set forth in Example 1 except that the charge-modified fumed silica was further treated with hexamethyldisilazane as follows: the cylindrical pressure vessel containing the product of 160 grams of CAB-O-SIL® HS-5 fumed silica and 19 grams of the cyclic silazane described in Example 1 was purged with dry nitrogen for 10 minutes, then placed under a slight static pressure of dry nitrogen. Approximately 22 grams of hexamethyldisilazane were added by syringe pump over a 10 minute period to the sealed, vigorously agitated vessel. Agitation was continued for 10 minutes after addition of the hexamethyldisilazane was complete. The sealed vessel was then heated at 90° C. for approximately 16 hours. Ammonia and excess hexamethyldisilazane were then removed by purging with dry nitrogen while slowly heating to approximately 125° C., and holding at approximately 125° C. for approximately 3 hours. The resulting product was a charge-modified hydrophobic fumed silica.

EXAMPLE 3

Preparation of a Charge-Modified Metal Oxide

A charge-modified metal oxide of the present invention was prepared from a previously hexamethyldisilazane-treated fumed silica as follows: A cylindrical metal pressure vessel was charged with 178 grams of CAB-O-SIL® TS-530 hydrophobic fumed silica powder (available from Cabot Corporation, Tuscola, Ill.). The fumed silica was dried in the unsealed vessel in air at 200° C. for approximately 16 hours. The vessel was then transferred while still hot to an inert atmosphere glove box and allowed to cool. In the same glove box a small glass jar containing approximately 4.6 grams of a cyclic silazane having the structure shown in Example 1 was tightly covered with a porous laboratory tissue which was permeable to vapors of the cyclic silazane but not to fumed silica. This jar was carefully placed inside the metal vessel containing the dried TS-530. The vessel was then sealed tightly and left at room temperature for approximately 16 hours, then heated at 60° C. for approximately 4 hours. The resulting product was a charge-modified hydrophobic fumed silica.

EXAMPLE 4

Preparation of a Charge-Modified Metal Oxide

A charge-modified metal oxide of the present invention was prepared by charging a cylindrical metal vessel with approximately 133 grams of a fumed alumina powder having a BET surface area of about 115 $m^2/g$ (available from Cabot Corporation, Tuscola, Ill.). The fumed alumina was dried in the unsealed vessel in air at 200° C. for approximately 40 hours. The vessel was then sealed and cooled to room temperature under a slow purge of dry nitrogen. When the vessel and its contents reached room temperature, the nitrogen purge was stopped and the vessel was left under a slight positive pressure of dry nitrogen. While the vessel cooled, a solution was prepared comprised of 19.4 grams of hexamethyldisilazane and 19.4 grams of the cyclic silazane whose structure was shown in Example 1. Using a syringe pump and a 50 milliliter gas tight syringe fitted with a Teflon® resin needle, approximately 16 grams of this solution of hexamethyldisilazane and the cyclic silazane were added continuously to the cooled, vigorously agitated vessel over a period of approximately 10 minutes. Agitation was continued for another 10 minutes after the addition of the mixture of silazanes was complete. The vessel was then sealed and left at room temperature for approximately 16 hours. The contents of the metal vessel were then transferred to a 5 liter Morton-type flask where excess silazanes and ammonia were removed under a slow nitrogen purge with agitation and heating to approximately 150° C. The resulting product was a charge-modified fumed alumina.

EXAMPLE 5

Preparation of a Charge-Modified Metal Oxide

A charge-modified metal oxide of the present invention was prepared by a wet process as follows: A 5 liter 4-neck Morton-type flask was fitted with a mechanical stirrer (glass shaft, Teflon® resin blade), a Teflon® non-stick coated thermocouple, an liquid addition funnel, and a water-cooled condenser on top of a Barrett trap. A gas inlet tube for establishing and maintaining an atmosphere of dry, inert gas was attached to the top of the water-cooled condenser. To this device was charged approximately 3.4 liters of dry toluene and approximately 117 grams of CAB-O-SIL® HS-5 fumed silica powder having a BET surface area of about 325 $m^2/g$ (available from Cabot Corporation, Tuscola, Ill.). Mechanical stirring of the resulting slurry was begun immediately and was continued throughout the treatment process. When the stirring was begun the reaction vessel was purged for a short time with dry nitrogen, then sealed under a slight positive pressure of nitrogen established with a gas bubbling device. The contents of the reaction vessel were then heated to the reflux temperature of toluene and maintained at this temperature while water collected in the Barrett trap. When no more water could be collected in the Barrett trap, heating was stopped and the contents of the reaction vessel were then allowed to cool to approximately 83° C. Approximately 29 grams of the cyclic silazane whose structure was shown in Example 1 were diluted with approximately 95 milliliters of dry toluene in the addition funnel. This solution was added dropwise to the reaction vessel over a period of about 20 minutes, during which time the temperature of the reaction vessel contents dropped to 82° C. Mechanical stirring under a dry nitrogen atmosphere was continued for approximately an additional 16 hours while the contents of the vessel were allowed to cool to room temperature. Stirring was stopped and the slurry was transferred to a 22 liter one-neck flask for solvent removed by rotary evaporation under vacuum on a Büchi Rotovapor® R-153 rotary evaporator. The resulting product was a charge-modified fumed silica.

EXAMPLE 6

Preparation of a Charge-Modified Metal Oxide

A charge-modified metal oxide of the present invention was prepared by charging approximately 12 grams of CAB-O-SIL® PTG fumed silica powder having a BET surface area of about 200 $m^2/g$ (available from Cabot Corporation, Tuscola, Ill.) to a cylindrical glass vessel, into the bottom of which was sealed a porous glass frit. At the top of the cylindrical vessel was a removable head with ground glass joints that was sealed to the vessel by means of a Viton® rubber o-ring, thus allowing treatment of the fumed silica in a completely controlled atmosphere. Approximately 7 grams of a cyclic silazane whose structure is given in Example 1 were placed in a small round bottom flask submerged in an oil bath equilibrated at 70° C. Into this sealed flask was passed a slow stream of dry nitrogen, which was then passed through the glass frit and into the cylindrical vessel containing the fumed silica at room temperature. In this manner over the course of approximately 2 hours the cyclic silazane was volatilized and transported through the bed of dry fumed silica as a vapor diluted in dry nitrogen. The resulting product was a charge-modified fumed silica.

EXAMPLE 7

Preparation of a Charge-Modified Metal Oxide

A charge-modified metal oxide of the present invention was prepared by charging approximately 70 grams of CAB-O-SIL® PTG fumed silica powder having a BET surface area of about 200 $m^2/g$ (available from Cabot Corporation, Tuscola, Ill.) to a plastic bottle with a wide-mouth screw top lid. Approximately 32 grams of a cyclic silazane whose structure is given in Example 1 were added to the bottle by syringe and the bottle was tightly sealed with the screw-top lid. The bottle was shaken for approximately 30 seconds, then placed on a paint roller and rolled for approximately 16 hours, then transferred to a glass vessel and heated at 100° C. to 150° C. for 16 hours to remove any unreacted cyclic silazane. The resulting product was a charge-modified fumed silica.

EXAMPLE 8

Preparation of a Toner

A black toner powder was prepared by melt-mixing and extruding 8.0% by weight MOGUL® L carbon black (available from Cabot Corporation, Boston, Mass.) and the remainder Dialec 1601 styrenated acrylic polymer (available from Polytribo Inc., Bristol, Pa.) in a B&P 19-millimeter extruder (available from B&P Process Equipment & Systems, LLC, Saginaw, Mich.). The carbon black/polymer product was then jet milled and classified using a Majac mini-grinder to form a black toner powder having an average particle size of about 12 microns, as determined using a Coulter Multisizer Particle Size Analyzer. Four toner compositions were then prepared by blending varying levels of the charge-modified metal oxide of Example 1 or Example 2 with the black toner powder with a Krups Mini Blender for approximately one minute. The relevant properties of the toner compositions are illustrated in Table I.

TABLE I

| Sample | Free-Flow Additive / Positive Charge Additive | Loading Level (%) | Angle of Repose Degree | Index |
| --- | --- | --- | --- | --- |
| 1 | Cab-O-Sil ® TS-530* | 0.50 | 29.6 | 24 |
| 2 | Aerosil ® R504† | 0.50 | 20.3 | 25 |
| 3 | HDK ® H2050 EP‡ | 0.50 | 21.1 | 25 |
| 4 | HDK ® H3050 EP VP‡ | 0.50 | 23.1 | 25 |
| 5 | Charge-Modified Metal Oxide of Example 1 | 0.50 | 21.8 | 25 |
| 6 | Charge-Modified Metal Oxide of Example 2 | 0.50 | 18.2 | 25 |
| 7 | Cab-O-Sil ® TS-530* | 0.75 | 25.5 | 24 |
| 8 | Aerosil ® R504† | 0.75 | 17.6 | 25 |
| 9 | HDK ® H2050 EP‡ | 0.75 | 20.8 | 25 |
| 10 | HDK ® H3050 EP VP‡ | 0.75 | 21.8 | 25 |
| 11 | Charge-Modified Metal Oxide of Example 1 | 0.75 | 11.5 | 25 |
| 12 | Charge-Modified Metal Oxide from Example 2 | 0.75 | 17.9 | 25 |

*Cabot Corporation, Tuscola, Illinois
†Degussa Corporation, Ridgefield Park, New Jersey
‡Wacker-Chemie GmbH, Munich, Germany The flowability of the toners was determined by measuring the angle of repose is illustrated in Table I and FIG. 1. The angle of repose test was conducted using a Hosokawa PT-N Powder Flow Tester (available from Hosokawa Micron, Summit, N.J.) utilizing the procedure described by the manufacturer in the user manual. The platform of the Powder Tester was vibrated at an amplitude of 1 millimeter and a frequency setting of 4.3. The angle measuring device available with the Powder Tester was used to determine the angle of repose.

As shown in FIG. 1, all samples exhibited low angles of repose. However, the charge-modified metal oxides of the present invention both exhibited the lowest angles of repose, thereby indicating improved aerated flow properties in the toner compositions.

Developer compositions were then prepared by mixing the toner compositions described above with a positive charging ferrite powder (available from Powdertech, Inc., Valparaiso, Ind.) in an amount sufficient to yield a 2.0% loading level and tumble blended in stainless steel vessels on a roll mill for approximately 60 minutes. For comparative purposes, eight additional developers were prepared as set forth above utilizing equivalent ratios of commercially available silica based free flow additives and/or positive charge agents.

Tribocharge measurements for all samples were determined by calculating the charge to mass ratio (Q/M) as a function of rolling time at 15, 30 and 60 minute intervals using a Vertex T-150 tribocharge tester (available from Vertex, Inc., Yukon, Pa.). The measurements are shown in FIG. 2 at a 0.5% loading level and FIG. 3 at a 0.75% loading level.

Figure 2:
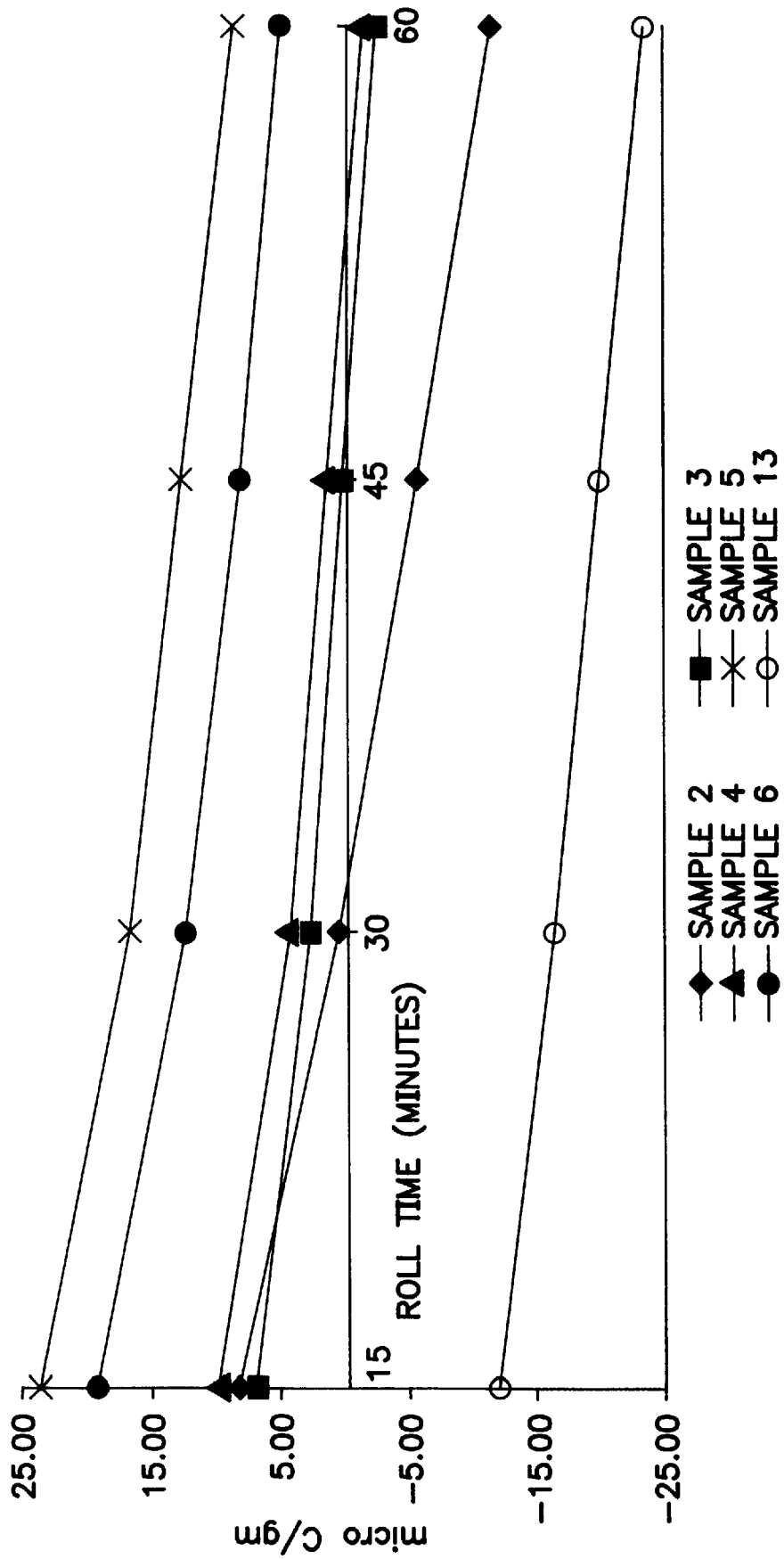
FIG. 2 is an illustration of tribocharging behavior of a developer in accordance with the present invention containing 0.5% of a free-flow additive, as represented by the charge to mass ratio ($\mu$C/gm) on the y-axis and roll mill time on the x-axis.
Figure 3:
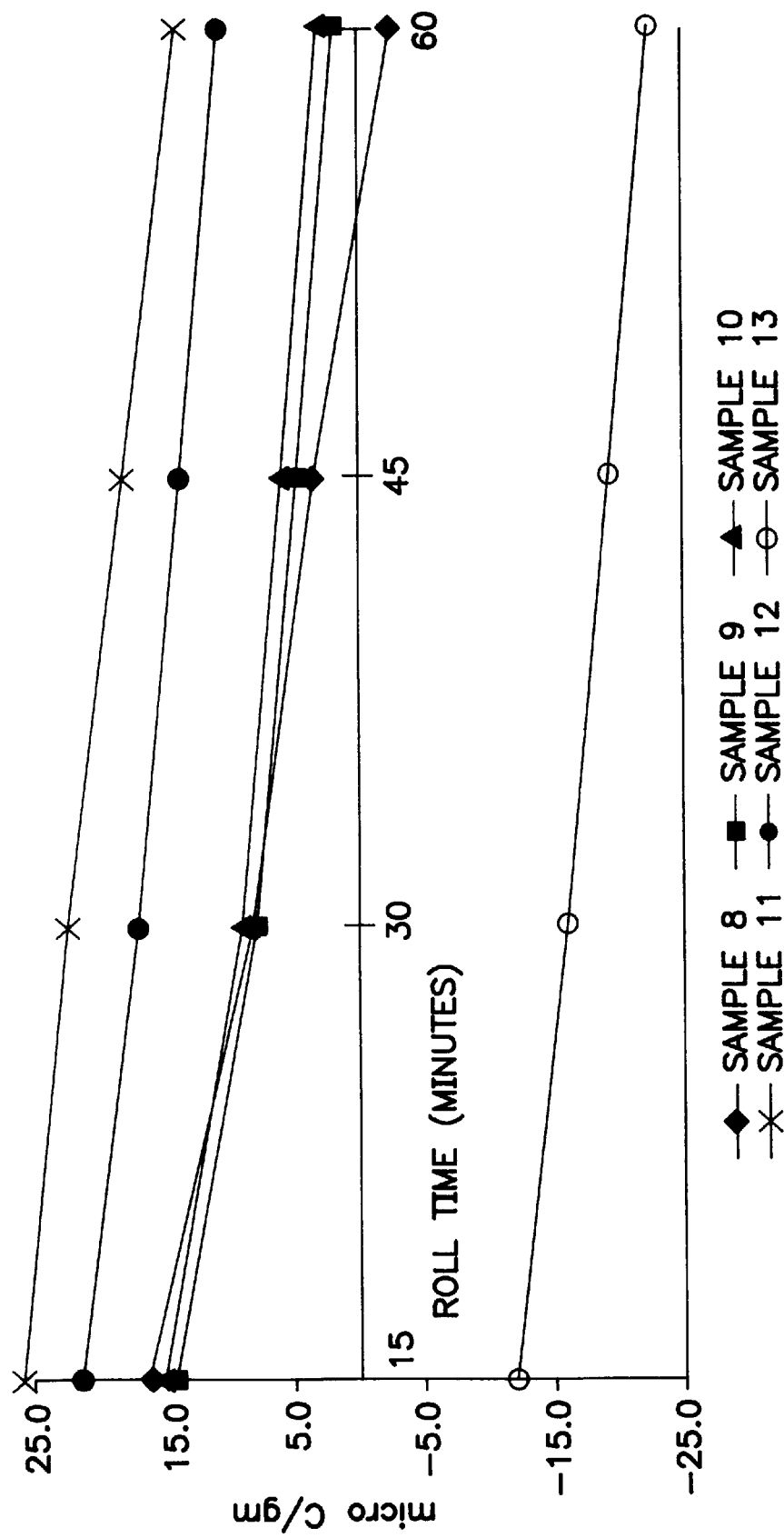
FIG. 3 is an illustration of tribocharging behavior of a developer in accordance with the present invention containing 0.75% of a free-flow additive, as represented by the charge to mass ratio ($\mu$C/gm) on the y-axis and roll mill time on the x-axis.

As noted from FIGS. 2 and 3, a decrease in charge level of the developer compositions was seen with roll milling time of all free-flow additives/positive charge additives. This may be contrasted to Sample 13 (no free-flow/positive charge additive) wherein a slightly lower rate of decrease in charge level was exhibited. However, the charge-modified metal oxides of the present invention in samples 5, 6, 11, and 12 all charged more positively than the conventional charge control additives, thereby increasing the magnitude of the positive charge generated by the developer alone.

EXAMPLE 9

Preparation of a Toner

A black toner powder was prepared by melt-mixing and extruding 8.0% by weight MOGUL® L carbon black (available from Cabot Corporation, Boston, Mass.) and the remainder Atlac® 382ES linear polyester resin (available from Reichold Chemicals Inc., Raleigh-Durham, N.C.), in a B&P 19-millimeter extruder (available from B&P Process Equipment & Systems, LLC, Saginaw, Mich.). The carbon black/resin product was then jet milled and classified using a Majac mini-grinder to form a black toner powder having an average particle size of about 12 microns, as determined using a Coulter Multisizer Particle Size Analyzer. Two toner compositions were then prepared by blending varying levels between 0.25% and 0.5% of the charge-modified metal oxide of Example 2 with the black toner powder with a Krups Mini Blender for approximately one minute. Developer compositions were then prepared by mixing the toner compositions described above with a positive charging ferrite powder (available from Powdertech, Inc., Valparaiso, Ind.) in an amount sufficient to yield a 2.0% loading level and tumble blended in stainless steel vessels on a roll mill for approximately 60 minutes. For comparative purposes, a developer was prepared as set forth except that it did not contain a free-flow and/or positive charge control additive.

Figure 4:
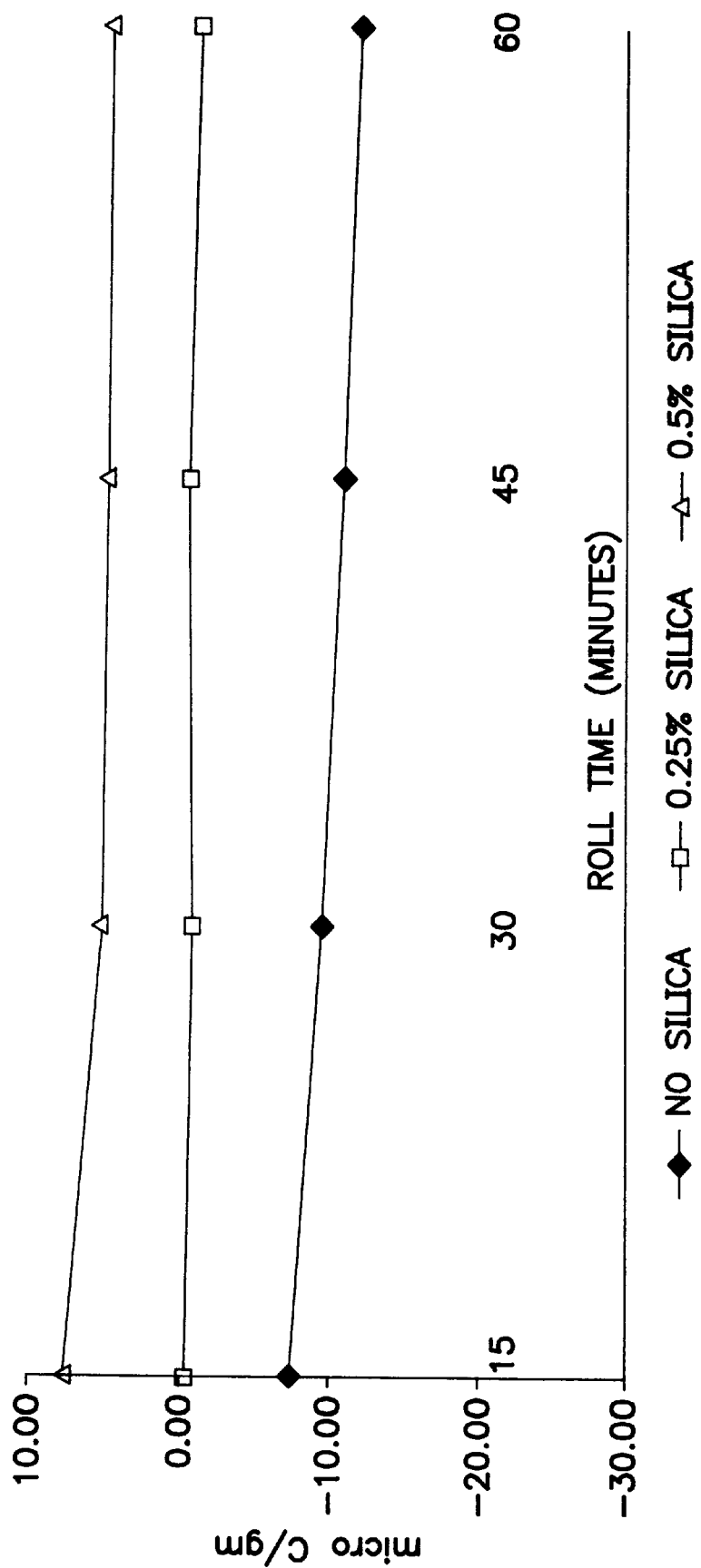
FIG. 4 is an illustration of tribocharging behavior of a developer in accordance with the present invention containing 0.25% of a free-flow additive, as represented by the charge to mass ratio ($\mu$C/gm) on the y-axis and roll mill time on the x-axis.

Tribocharge measurements for all samples were determined by calculating the charge to mass ratio (Q/M) as a function of rolling time at 15, 30 and 60 minute intervals using a Vertex T-150 tribocharge tester (available from Vertex, Inc., Yukon, Pa.), as illustrated in FIG. 4.

This Example illustrates that the charge-modified metal oxide of the present invention is useful in different toner resin systems and at varying loading levels. As noted from FIG. 4, the charge-modified metal oxide of the present invention influenced the charge of the developer composition from negative charging behavior to positive charging behavior.

EXAMPLE 10

Preparation of a Toner

A black toner powder was prepared by melt-mixing and extruding 8.0% by weight MOGUL® L carbon black (available from Cabot Corporation, Boston, Mass.), 2.0% Bontron N-07A charge control additive (available from Orient Chemical, Ltd., Osaka, Japan) and the remainder Dialec 1601 styrenated acrylic polymer (available from Polytribo Inc., Bristol, Pa.) in a B&P 19-millimeter extruder (available from B&P Process Equipment & Systems, LLC, Saginaw, Mich.). The resulting product was then jet milled and classified using a Majac mini-grinder to form a black toner powder having an average particle size of about 12 microns, as determined using a Coulter Multisizer Particle Size Analyzer. Two toner compositions were then prepared by blending 0.5% of the charge-modified metal oxide of Example 2 with the black toner powder with a Krups Mini Blender for approximately one minute.

Developer compositions were then prepared by mixing the toner described above with a positive charging ferrite powder (available from Powdertech, Inc. Valparaiso, Ind.) in an amount sufficient to yield a 2.0% loading level and tumble blended in stainless steel vessels on a roll mill for approximately 60 minutes. For comparative purposes, a developer was prepared as described above except that it contained a commercially available positive charge directing free-flow additive, Aerosil® R504.

Tribocharge measurements for all samples were determined by calculating the charge to mass ratio (Q/M) as a function of rolling time at 15, 30 and 60 minute intervals using a Vertex T-150 tribocharge tester (available from Vertex, Inc., Yukon, Pa.), as illustrated in FIG. 5.

As noted from FIG. 5, the charge-modified metal oxide of the present invention exhibited comparable behavior to commercially available charge control additives in similar systems.

The charge-modified metal oxides of the present invention have been found to provide effective free-flow attributes to toner or developer compositions and may further influence the charging characteristics of same. In addition, the charged-modified metal oxide has been found to provide good dispersibility, fluidity, and batch to batch reproducibility.

It is further understood that the present invention is not limited to the particular embodiments shown and described herein, but that various changes and modifications may be made without departing from the scope and spirit of the invention.

What is claimed is:

1. A positively charged toner composition comprised of resin particles, at least one colorant, and a charge-modified metal oxide having a cyclic silazane treated therewith, wherein said cyclic silazane is represented by the following formula:

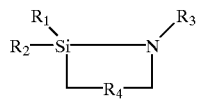

wherein $R_1$ and $R_2$ are independently selected from the group consisting of hydrogen, halogen, alkyl, alkoxy, aryl, and aryloxy; $R_3$ is selected from the group consisting of hydrogen, $(CH_2)_n CH_3$, wherein n is an integer between 0 and 3, $C(O)(CH_2)_n CH_3$, wherein n is an integer between 0 and 3, $C(O)NH_2$; $C(O)NH(CH_2)_n CH_3$, wherein n is an integer between 0 and 3, and $C(O)N[(CH_2)_n CH_3](CH_2)_m CH_3$, wherein n and m are integers between 0 and 3; and $R_4$ is represented by the formula $[(CH_2)_a (CHX)_b (CYZ)_c]$, wherein X, Y and Z are independently selected from the group consisting of hydrogen, halogen, alkyl, alkoxy, aryl, and aryloxy, and a, b, and c are integers between 0 and 6 satisfying the condition that (a+b+c) equals an integer between 2 and 6.

2. The toner composition of claim 1, wherein the charge-modified metal oxide is present in an amount ranging from about 0.05% to about 5.0% weight percent.

3. The toner composition of claim 2, wherein the charge-modified metal oxide is present in an amount ranging from about 0.25% to about 1.0% weight percent.

4. The toner composition of claim 1, wherein said resin particles are selected from styrene polymers, polyesters, and mixtures thereof.

5. The toner composition of claim 1, wherein said resin particles are selected from styrene acrylates, styrene methacrylates, polyesters, styrene butadienes, and mixtures thereof.

6. The toner composition of claim 1, wherein said colorant is a pigment, a dye, or a combination thereof.

7. The toner composition of claim 1, wherein said metal oxide is a silica, an alumina, a ceria, a germania, a titania, a zirconia, and mixtures thereof.

8. The toner composition of claim 1, wherein said metal oxide is a fumed metal oxide, a cofumed metal oxide, a precipitated metal oxide, a gel based metal oxide and mixtures thereof.

9. The toner composition of claim 8, wherein said gel based metal oxide is an aerogel, silica gel, a xerogel, or a mixture thereof.

10. The toner composition of claim 1, wherein said metal oxide has a BET surface area of between about 40 m$^2$/g and about 1000 m$^2$/g.

11. The toner composition of claim 10, wherein said metal oxide has a BET surface area of between about 50 m$^2$/g and about 400 m$^2$/g.

12. The toner composition of claim 11, wherein said metal oxide has a BET surface area of between about 100 m$^2$/g and about 350 m$^2$/g.

13. The toner composition of claim 1, wherein the metal oxide has a mean agglomerate size between about 0.05 μm to about 200 μm.

14. The toner composite of claim 13, wherein the metal oxide has a mean agglomerate size between 1 μm to about 30 μm.

15. The toner composition of claim 1, wherein said cyclic silazane is represented by the following formula:

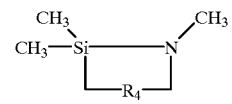

wherein $R_4$ is represented by the formula $[(CH_2)_a (CHX)_b (CYZ)_c]$, wherein X, Y and Z are independently selected from the group consisting of hydrogen, halogen, alkyl, alkoxy, aryl, and aryloxy, and a, b, and c are integers between 0 and 6 satisfying the condition that (a+b+c) equals an integer between 3 and 4.

16. The toner composition of claim 1, wherein said cyclic silazane is present in an amount sufficient to achieve between about 0.01% and about 2.75% by weight of elemental nitrogen on the surface of the metal oxide.

17. The toner composition of claim 16, wherein said cyclic silazane is present in an amount sufficient to achieve between about 0.08% and about 1.75% by weight of elemental nitrogen on the surface of the metal oxide.

18. The toner composition of claim 17, wherein said cyclic silazane is present in an amount sufficient to achieve between about 0.2% and about 1.1% by weight of elemental nitrogen on the surface of the metal oxide.

19. The toner composition of claim 1, wherein said charge-modified metal oxide further comprises a hydrophobic treating agent.

20. The toner composition of claim 19, wherein said hydrophobic treating agent is at least one of the following compounds: an organopolysiloxane, an organosiloxane, an organosilazane, an organosilane, a halogenorganopolysiloxane, halogenorganosiloxane, a halogenorganosilazane, or a halogenorganosilane.

21. The toner composition of claim 1, wherein said toner composition further comprises a charge control additive.

22. A developer composition comprising a toner composition having resin particles, at least one colorant, carrier particles, and a charge-modified metal oxide having a cyclic silazane treated therewith, wherein said cyclic silazane is represented by the following formula:

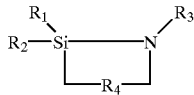

wherein $R_1$ and $R_2$ are independently selected from the group consisting of hydrogen, halogen, alkyl, alkoxy, aryl, and aryloxy; $R_3$ is selected from the group consisting of hydrogen, $(CH_2)_nCH_3$, wherein n is an integer between 0 and 3, $C(O)(CH_2)_nCH_3$, wherein n is an integer between 0 and 3, $C(O)NH_2$; $C(O)NH(CH_2)_nCH_3$, wherein n is an integer between 0 and 3, and $C(O)N[(CH_2)_nCH_3](CH_2)_mCH_3$, wherein n and m are integers between 0 and 3; and $R_4$ is represented by the formula $[(CH_2)_a(CHX)_b(CYZ)_c]$, wherein X, Y and Z are independently selected from the group consisting of hydrogen, halogen, alkyl, alkoxy, aryl, and aryloxy, and a, b, and c are integers between 0 and 6 satisfying the condition that (a+b+c) equals an integer between 2 and 6.

23. The developer composition of claim 22, wherein the carrier particles are ferrites, steel, or iron powders.

24. A method of imaging which comprises formulating an electrostatic latent image on a negatively charged photoconductive imaging member, affecting the development thereof with toner composition comprising resin particles, at least one colorant, and a charge-modified metal oxide treated with a cyclic silazane, wherein said cyclic silazane is represented by the following formula:

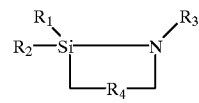

wherein $R_1$ and $R_2$ are independently selected from the group consisting of hydrogen, halogen, alkyl, alkoxy, aryl, and aryloxy; $R_3$ is selected from the group consisting of hydrogen, $(CH_2)_nCH_3$, wherein n is an integer between 0 and 3, $C(O)(CH_2)_nCH_3$, wherein n is an integer between 0 and 3, $C(O)NH_2$; $C(O)NH(CH_2)_nCH_3$, wherein n is an integer between 0 and 3, and $C(O)N[(CH_2)_nCH_3](CH_2)_mCH_3$, wherein n and m are integers between 0 and 3; and $R_4$ is represented by the formula $[(CH_2)_a(CHX)_b(CYZ)_c]$, wherein X, Y and Z are independently selected from the group consisting of hydrogen, halogen, alkyl, alkoxy, aryl, and aryloxy, and a, b, and c are integers between 0 and 6 satisfying the condition that (a+b+c) equals an integer between 2 and 6, and thereafter transferring the developed image onto a suitable substrate.

25. The method of imaging of claim 24, wherein the transferred image is permanently fixed to the substrate.

* * * * *